United States Patent
Yuda

Patent Number: 5,758,985
Date of Patent: Jun. 2, 1998

[54] APPARATUS AND METHOD FOR FIXING A PISTON TO A PISTON ROD

[76] Inventor: Lawrence F. Yuda, 105 Meadowcrest Dr., Seneca, S.C. 29678

[21] Appl. No.: 733,777

[22] Filed: Oct. 18, 1996

[51] Int. Cl.[6] .................................. F16J 1/10
[52] U.S. Cl. .................. 403/24; 403/268; 403/375; 92/172; 29/888.044
[58] Field of Search .................. 403/265, 266, 403/267, 268, 24, 375, 326; 192/172, 255, 256, 242, 243, 244, 245, 247; 29/888.04, 888.042, 888.047

[56] References Cited

U.S. PATENT DOCUMENTS

| 3,232,186 | 2/1966 | Garrett et al. | 92/243 X |
| 3,744,382 | 7/1973 | Williams | 92/243 X |
| 4,172,678 | 10/1979 | Schowald et al. | 403/268 X |
| 4,372,702 | 2/1983 | Devaud | 92/172 X |
| 4,380,951 | 4/1983 | Bottoms | 92/244 |
| 4,560,189 | 12/1985 | Lang et al. | 403/265 X |
| 4,601,235 | 7/1986 | Roberts | 92/245 |
| 4,773,282 | 9/1988 | Benton et al. | 403/267 X |
| 5,052,848 | 10/1991 | Nakamura | 403/268 |

FOREIGN PATENT DOCUMENTS

| 727929 | 4/1980 | U.S.S.R. | 92/255 |
| 1546734 | 2/1990 | U.S.S.R. | 92/172 |
| 2045389 | 10/1980 | United Kingdom | 92/255 |
| 2129092 | 5/1984 | United Kingdom | 92/172 |

*Primary Examiner*—Harry C. Kim
*Attorney, Agent, or Firm*—Ralph Bailey

[57] ABSTRACT

Apparatus and method for joining a piston in a precise leak proof junction on a rod utilizes an axial longitudinally elongated reservoir (A) in a bore within the piston which serves as a receptacle for a bonding agent (B), an annular groove (C) in the piston rod serves to position an O-ring member (D) serving as a support for the piston and as a closure on one end of the reservoir.

7 Claims, 2 Drawing Sheets

APPARATUS AND METHOD FOR FIXING A PISTON TO A PISTON ROD

BACKGROUND OF THE INVENTION

This invention relates to a precisely aligned leak proof combination piston and piston rod assembly and method of fixing a piston to a piston rod.

Pistons are generally integrally joined to piston rods as by molding or by precision machining the entire combination from solid bar stock. The practice of machining is particularly prevalent in the manufacture of miniaturized fluid powered actuators requiring precise tolerances for meeting the exacting requirements generally called for in robotics and other specialized applications. To meet the many strict requirements of such constructions, expensive and time consuming procedures must be undertaken. Understandably, these problems are exacerbated when length to diameter ratios of the piston rod are significantly great.

Efforts have been made to provide leak proof connections between pistons and rotating shafts as exemplified by U.S. Pat. Nos. 4,384,727, as well as between pistons and cylinder walls as in U.S. Pat. No. 4,443,017. Such applications are relatively costly and lack the precision and strength necessary in applications required for affixing pistons in fixed relations to shafts as required in miniaturized fluid operated cylinders.

A particular application wherein apparatus and method in accordance with the invention would be desirable is in the piston and cylinder assembly illustrated in U.S. Pat. No. 5,522,302 wherein plural aligned sealed compartments are provided for containing multiple piston assemblies. In such applications the rigidity and strength are required especially where pistons are to be positioned intermediate the ends of the rods as is often required in serial multi-piston applications.

SUMMARY OF THE INVENTION

Accordingly, it is an important object of the invention to provide a simple but effective apparatus and method for securing a piston to a piston rod for precision use such as in robotics without forming the entire assembly of a single elongated piece of metallic stock and without the necessity of molding.

Another important object of the invention is to provide a simplified method for accurately joining a piston to a piston rod forming a rigid geometrically precise and leak proof joint.

It has been found that combination piston rods and pistons having accurately aligned positioning thereon in a rigid, strong, leak proof joint may be facilitated utilizing an axial reservoir in the piston extending along a central bore wherein an annular groove in the piston rod serves as an aid for receiving a bonding agent injected into the reservoir, affording an aligned support for the piston and a closure for the reservoir at one end of the piston.

While the combination piston and piston rod is illustrated as including an O-ring support at one end for retaining the bonding agent within the angular groove and for providing support and precise longitudinal location for the piston, it is to be understood that variations are possible as, for example, wherein funnel shaped recessed grooves within the piston at the entrance to the reservoir facilitate introduction of a fluid bonding agent during assembly, and variations are possible wherein snap rings are utilized to provide the necessary support as well as closure at the entrance side to the reservoir. Where recessed grooves are utilized in the pistons the O-rings and the like may be completely enclosed within the bounds of the cylinder so as not to present an obstacle to completing a full stroke of the piston.

The method contemplates using a distortion free adhesive bonding agent for integrally bonding a piston to a rod and machining a groove on the shaft to provide support and precise location while also supplying a leak proof joint.

BRIEF DESCRIPTION OF THE DRAWINGS

The construction designed to carry out the invention will be hereinafter described, together with other features thereof.

The invention will be more readily understood from a reading of the following specification and by reference to the accompanying drawings forming a part thereof, wherein an example of the invention is shown and wherein.

DESCRIPTION OF THE PREFERRED EMBODIMENT

The drawings illustrate apparatus and method for rigidly fixing a piston to a piston rod including an axial longitudinally elongated reservoir A in the piston extending along a central opening receiving the piston rod. A bonding agent B is provided in the receptacle for joining the piston at right angles to the shaft along the receptacle. An annular groove C is formed in the piston rod adjacent at least one end of the reservoir providing a receptacle for a first annular member D for locating the piston and for closing the reservoir. A second annular member provides support for the piston and closure for the reservoir at the other end of the reservoir. Thus, the piston is securely integrally positioned in accurate alignment on the piston rod.

Figure 1:
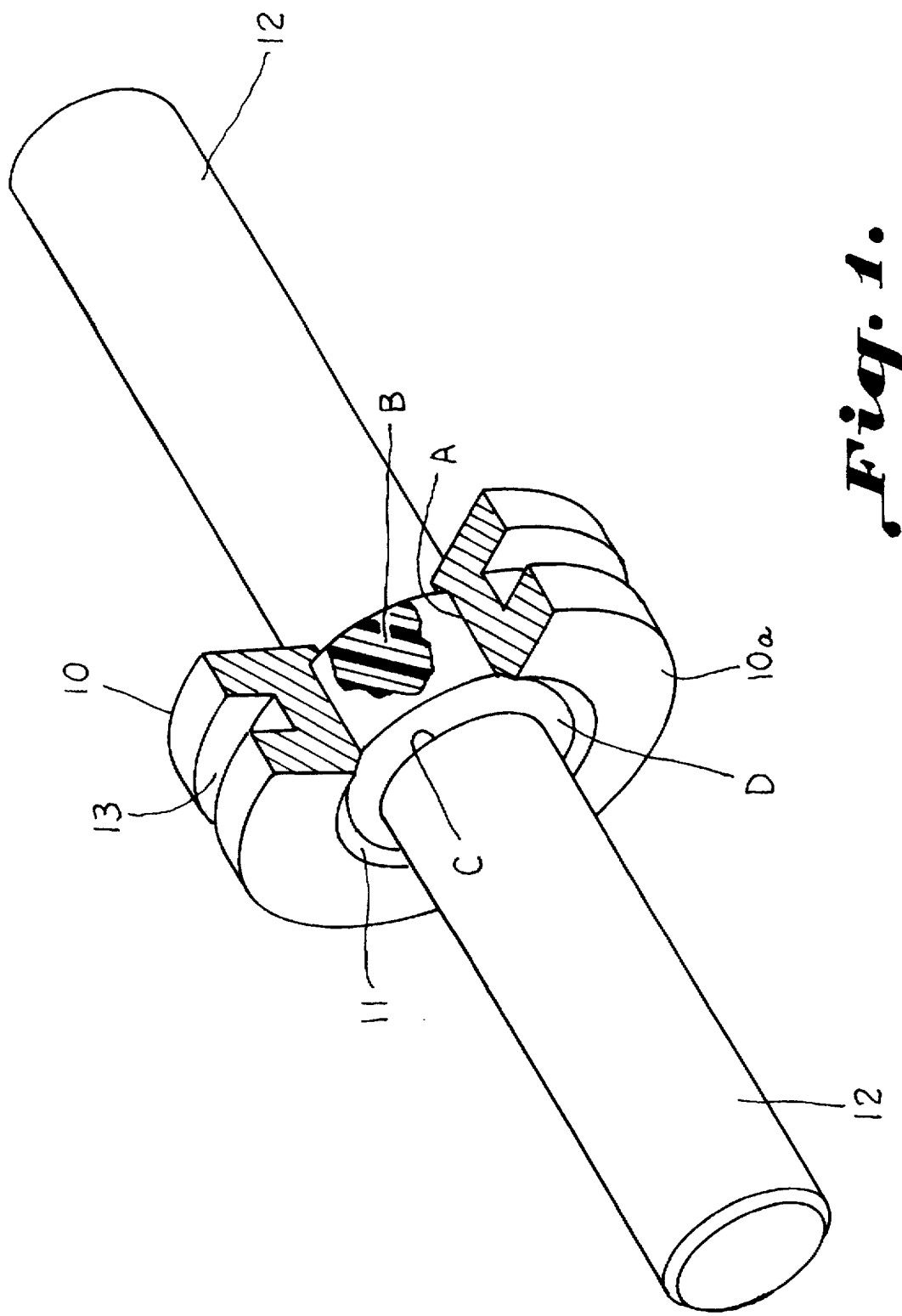
FIG. 1 is a perspective view, with parts broken away, illustrating the method and apparatus for attaching an annular piston at right angles across an intermediate portion of a piston rod for accurate alignment providing a strong leak proof mooring utilizing a resilient deformable O-ring constructed of rubbery synthetic material wherein a bonding agent is sealed thereby within a reservoir carried in the bore of the piston in accordance with the invention.
Figure 2:
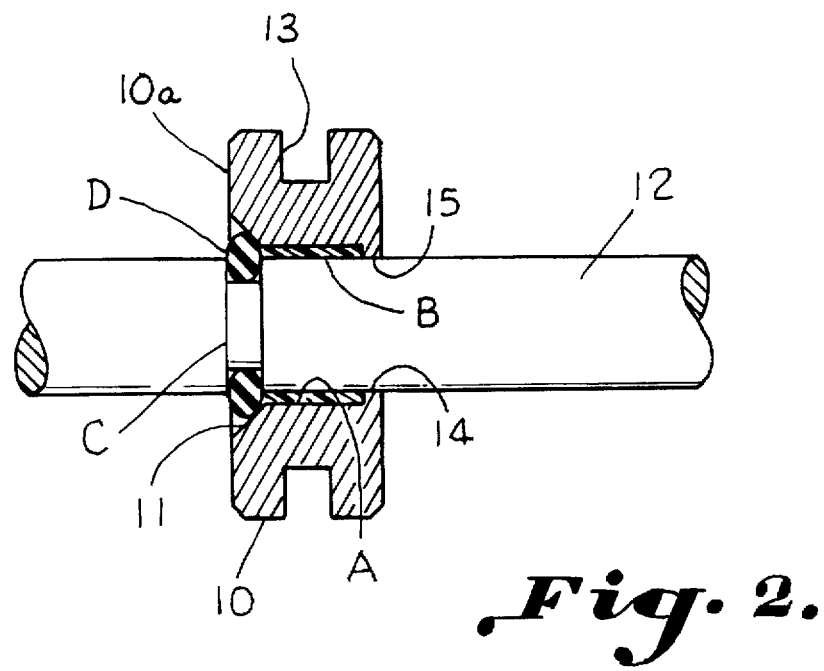
FIG. 2 is a longitudinal sectional elevation further illustrating the reservoir and positioning of a deformable O-ring in an annular groove in the piston rod for support and closure of the elongated reservoir extending along the bore of a piston for reception and rigid integral support upon the piston rod in a precise location.

Referring more particularly to FIGS. 1 and 2, the first annular member D is illustrated as an O-ring carried within an annular groove C in the piston rod. The piston rod 10 is chamfered as at 11 serving as a guide for receiving the O-ring D within the groove C and acting as a funnel facilitating the injection of adhesive fluid into the elongated reservoir A which is carried within an axial bore in the piston. The piston 10 is carried on a piston rod 12 and is illustrated as having an external groove 13 for receiving a piston ring (not shown).

The piston also has a bonding area within the receptacle and a close tolerance support area against the rod. When assembled with an adhesive bond, the piston and shaft form a rigid, concentric, distortion free structure. The O-ring provides an extra support to guard against misalignment and is confined within the piston so as to extend outwardly of the side wall 10a only slightly acting as a cushion at the end of a piston stroke. The squeeze on the O-ring between the piston and shaft causes deformation of the O-ring and prevents fluid from leaking through the joint.

Figure 3:
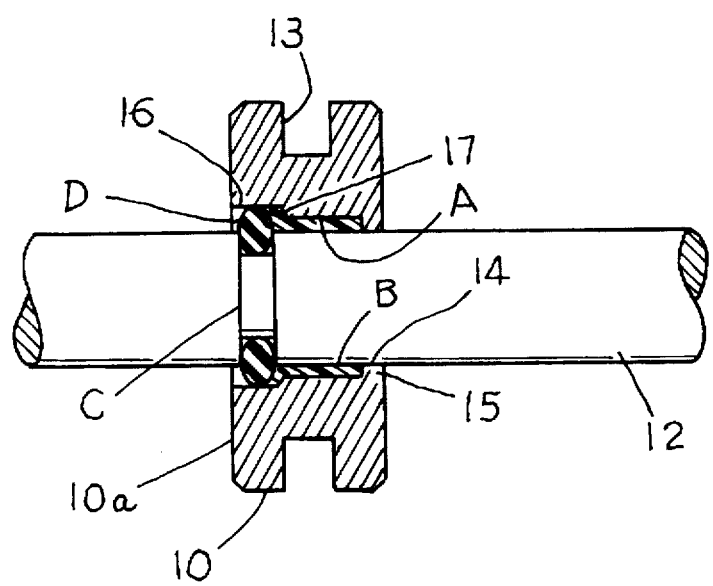
FIG. 3 is a longitudinal sectional elevation similar to FIG. 2 illustrating a modified form of the invention wherein a funnel shaped entrance is provided facilitating injection of a bonding agent within the reservoir for accurate positioning of the O-ring providing the necessary closure and support and wherein the O-ring is fully recessed within the piston.

It will be observed in FIG. 3 that the O-ring D is retained within the side wall 10a of the piston so as not to engage an abutting end of the cylinder upon completion of a full stroke of a piston and piston rod. A remaining portion of the bore is illustrated at 14, the elongated reservoir A having been machined out of the bore prior to placement upon the piston rod 12.

A second annular lip member 15 is formed thereby as illustrated in FIGS. 2 and 3 as providing support for the piston and closure for the reservoir at an opposite end of the reservoir from the O-ring member D. The O-ring and the second annular member 15 form spaced supports on each end of the piston bore and serve to support the piston and seal the liquid adhesive when it is introduced into the reservoir A. The piston A is illustrated as being thus fastened at an intermediate portion of a piston rod 12 as is required in piston and rod assemblies such as illustrated in U.S. Pat. No. 5,522,302.

The structure of the embodiment of FIG. 3 prevents the O-ring from contacting any internal stop against the piston. Also shown is a funnel shaped entrance to the reservoir that aids flow of the adhesive during the assembly process. In this embodiment the chamfer is removed in favor of a funnel shaped opening formed by a cylindrical portion 16 which terminates in an inwardly tapering surface 17 leading into the reservoir A. In both of these constructions the piston is firmly supported against rotation and any other movement on the shaft and the first and second annular members D and 15 serve as supports to guard against misalignment.

The bonding agent may include any adhesive that can be used to retain metallic components. It may be a two part epoxy bond or a single part adhesive. These adhesives may be aerobic or anaerobic. A preferred adhesive is an anaerobic adhesive from Loctite Corporation designated Product No. 638. This fills the gap of about 0.002 "to about 0.005" between the piston and rod. When the air in this gap is displaced by the adhesive solution, anaerobic curing occurs and bonds the adjacent parts.

While a preferred embodiment of the invention has been described using specific terms, such description is for illustrative purposes only, and it is to be understood that changes and variations may be made without departing from the spirit or scope of the following claims.

What is claimed is:

1. Apparatus including a piston and a piston rod comprising:
   an axial longitudinally elongated reservoir in the piston extending along a central opening receiving the piston rod;
   a bonding agent in the reservoir for joining the piston to said rod along said receptacle;
   an annular groove in said piston rod adjacent at least one end of said reservoir;
   first annular member in said annular groove providing support for said piston and closure for said reservoir at said one end of said reservoir; and
   a second annular member providing support for said piston and closure for said reservoir at the other end of said reservoir;
   whereby said piston is rigidly fixed and securely positioned in accurate alignment on said piston rod.

2. The apparatus set forth in claim 1 wherein said first annular member is an O-ring.

3. The apparatus set forth in claim 2 including an inwardly tapering surface in the piston opening into said reservoir receiving said O-ring within the piston.

4. The apparatus set forth in claim 2 including a funnel shaped opening in the piston opening into the reservoir receiving said O-ring entirely within the piston inside an adjacent external face of the piston.

5. A method for rigidly fixing a piston to a piston rod comprising the steps of the steps of:
   forming an axial longitudinally elongated reservoir in the piston along a central opening receiving the piston rod;
   adhesively bonding the piston to the rod along the reservoir;
   forming an annular groove in the piston rod adjacent at least one end of the reservoir;
   providing support for said piston and closure for said reservoir at said one end of said reservoir by positioning a first annular member in said annular groove; and
   providing support for said piston and closure for said reservoir at the other end of said reservoir by a second annular member;
   whereby the piston is securely positioned in accurate alignment on the piston rod.

6. The method set forth in claim 5 including the steps of installing an O-ring in said annular groove; and utilizing an annular lip extending across the other end of the reservoir as a support and closure.

7. The method set forth in claim 6 including the step of injecting a liquid anaerobic adhesive in said elongated reservoir before installing the O-ring.

* * * * *